US012636797B2

(12) United States Patent (10) Patent No.: US 12,636,797 B2
Grimm et al. (45) Date of Patent: May 26, 2026

(54) ROAD DEBRIS DETECTION AND REMOVAL SYSTEM

(71) Applicant: GM Global Technology Operations LLC, Detroit, MI (US)

(72) Inventors: Donald K. Grimm, Utica, MI (US); Chandra Sekhar Talluri, Warren, MI (US); Shawn F. Granda, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 841 days.

(21) Appl. No.: 18/062,248

(22) Filed: Dec. 6, 2022

(65) Prior Publication Data

US 2024/0181650 A1 Jun. 6, 2024

(51) Int. Cl.
*B25J 11/00* (2006.01)
*B25J 9/16* (2006.01)
*B25J 13/00* (2006.01)
*B25J 19/04* (2006.01)
*E01H 1/00* (2006.01)

(52) U.S. Cl.
CPC ........... *B25J 11/0085* (2013.01); *B25J 9/161* (2013.01); *B25J 9/162* (2013.01); *B25J 9/1684* (2013.01); *B25J 13/006* (2013.01); *B25J 19/04* (2013.01); *E01H 1/00* (2013.01)

(58) Field of Classification Search
CPC ........... B25J 9/162; B64D 1/22; G06N 20/00; G05D 1/102; G05D 1/101; G06Q 10/30
See application file for complete search history.

(56) References Cited

U.S. PATENT DOCUMENTS

2018/0075417 A1 * 3/2018 Gordon .................... B64D 1/22

FOREIGN PATENT DOCUMENTS

| CN | 105955302 A | * | 9/2016 | ............. G05D 1/102 |
| CN | 115328209 A | * | 11/2022 | ............. G05D 1/101 |
| WO | WO-2020205597 A1 | * | 10/2020 | ............. G06N 20/00 |

* cited by examiner

*Primary Examiner* — Yuri Kan
(74) *Attorney, Agent, or Firm* — Vivacqua Crane, PLLC

(57) ABSTRACT

A road debris detection system includes a data processor in wireless communication with a base facility, the base facility including a plurality of aerial response vehicles adapted to be deployed from the base facility, each of the plurality of aerial response vehicles being specialized to perform specific tasks, the data processor adapted to receive data related to a roadway, assess if debris is present within the roadway, and when debris is present within the roadway assess the nature of the detected debris, select an aerial response vehicle from the plurality of aerial response vehicles at the base facility that is specialized to remove/move the detected debris and is capable based on the type, size and weight of the detected debris, and deploy the selected aerial response vehicle to clean-up the debris.

20 Claims, 3 Drawing Sheets

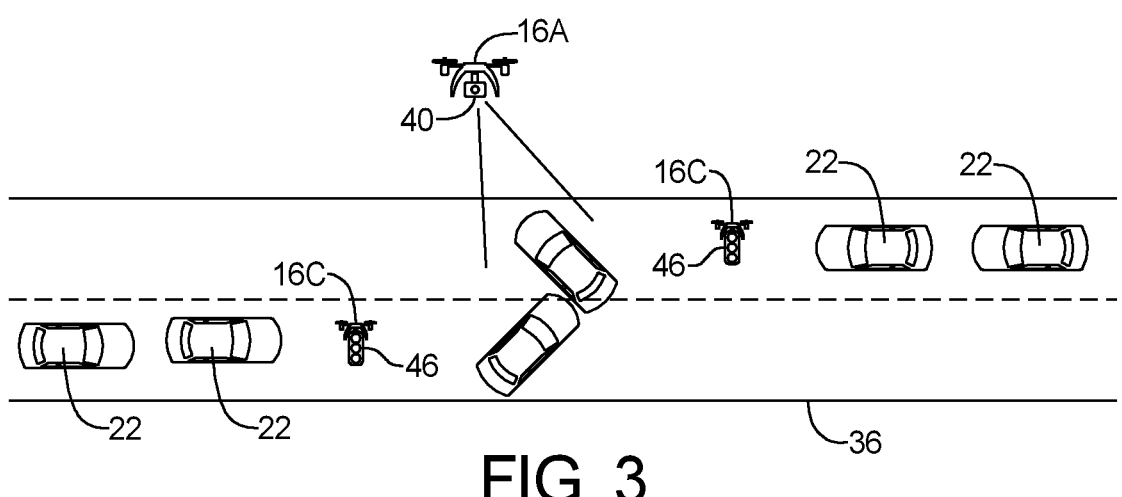
FIG. 3
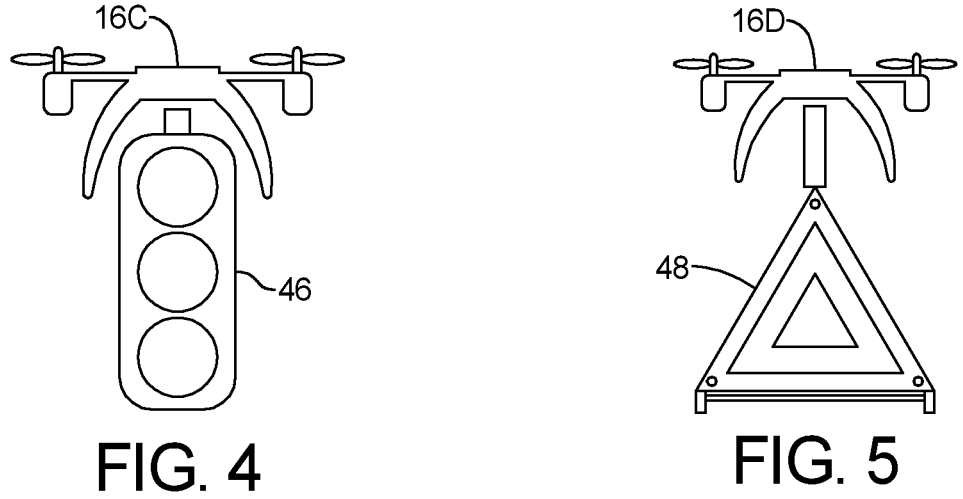
FIG. 4                    FIG. 5
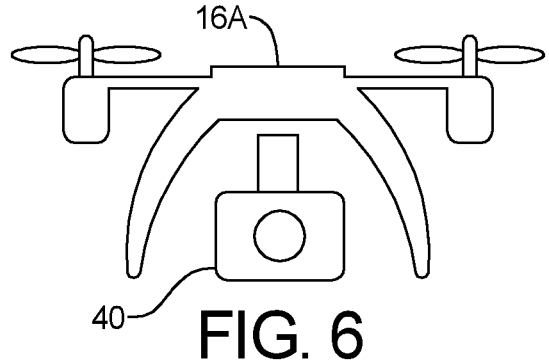
FIG. 6

1

ROAD DEBRIS DETECTION AND REMOVAL SYSTEM

INTRODUCTION

The present disclosure relates to a road debris detection and removal system. Roadways and highways may accumulate various types of debris that affect traffic safety, traffic flow or contribute to community blight. Current detection of debris relies on user reports and manual dispatch of cleanup personnel. Delays in reporting and dispatching prolong the duration that debris remains on the roadway.

Thus, while current systems and methods achieve their intended purpose, there is a need for a new and improved road debris detection and removal system and corresponding method that automatically and autonomously detects debris within a roadway, assesses the debris and deploys an appropriate aerial response vehicle.

SUMMARY

According to several aspects of the present disclosure, a method of road debris detection includes receiving, with a data processor of a road debris detection system, data related to a roadway, assessing, with the road debris detection, if debris is present within the roadway, and when debris is present within the roadway, assessing, with the road debris detection system, the nature of the detected debris, selecting, with the road debris detection system, an aerial response vehicle based on the nature of the detected debris, and sending, with the road debris detection system, the selected aerial response vehicle to clean-up the debris.

According to another aspect, the receiving, with the road debris detection system, data related to the roadway further includes, receiving, via a wireless communication network, data collected by a plurality of connected vehicles that each include a plurality of onboard sensors adapted to collect data related to the roadway.

According to another aspect, the receiving, with the road debris detection system, data related to the roadway further includes, receiving, via a wireless communication network, data collected by at least one infrastructure sensor that is adapted to collect data related to the roadway.

According to another aspect, the method further includes fusing, with the road debris detection system, the data collected by the plurality of connected vehicles with the data collected by the at least one infrastructure sensor.

According to another aspect, the assessing, with the road debris detection system, the nature of the detected debris further includes determining, with the road debris detection system, an approximate weight of the detected debris, an approximate size of the detected debris and a type of the detected debris.

According to another aspect, the assessing, with the road debris detection system, the nature of the detected debris further includes classifying the detected debris as one of an object that needs to be removed from the roadway and taken away and an object that can be moved off to a side of the roadway, and prioritizing the detected debris based on an impact to the flow of traffic on the roadway.

According to another aspect, the road debris detection system includes a base facility wherein a plurality of aerial response vehicles are housed and from which the plurality of aerial response vehicles are adapted to be deployed, each of the plurality of aerial response vehicles being specialized to perform specific tasks, wherein, the selecting, with the road debris detection system, an aerial response vehicle based on the nature of the detected debris further includes selecting, from the plurality of aerial response vehicles housed within the base facility, an aerial response vehicle that is specialized to remove/move the detected debris and is capable based on the type, size and weight of the detected debris.

According to another aspect, the method further includes sending, via the wireless communication network, a message to a manual service provider, when an aerial response vehicle is not available that is specialized to remove/move the detected debris and is capable based on the type, size and weight of the detected debris.

According to another aspect, the receiving, with the road debris detection system, data related to the roadway further includes, receiving, via a wireless communication network, data collected by an aerial response vehicle that is equipped with at least one sensor adapted to collect data related to the roadway.

According to another aspect, the method further includes assessing, with the road debris detection system, if the debris requires traffic control measures, and when traffic control measures are required, assessing, with the road debris detection system, the nature of the traffic control measures required, selecting, with the road debris detection system, an aerial response vehicle based on the required traffic control measures, and sending, with the road debris detection system, the selected aerial response vehicle to provide the required traffic control measures.

According to several aspects of the present disclosure, a road debris detection system includes a data processor in wireless communication with a base facility, the base facility including a plurality of aerial response vehicles adapted to be deployed from the base facility, each of the plurality of aerial response vehicles being specialized to perform specific tasks, the data processor adapted to receive data related to a roadway, assess if debris is present within the roadway, and when debris is present within the roadway, assess the nature of the detected debris, select an aerial response vehicle from the plurality of aerial response vehicles at the base facility that is specialized to remove/move the detected debris and is capable based on the type, size and weight of the detected debris, and deploy the selected aerial response vehicle to clean-up the debris.

According to another aspect, the data processor is adapted to receive data related to the roadway, via a wireless communication network, from a plurality of connected vehicles that each include a plurality of onboard sensors adapted to collect data related to the roadway.

According to another aspect, the data processor is adapted to receive data related to the roadway, via the wireless communication network, from at least one infrastructure sensor that is adapted to collect data related to the roadway.

According to another aspect, the data processor is adapted to fuse the data collected by the plurality of connected vehicles with the data collected by the at least one infrastructure sensor.

According to another aspect, the data processor is further adapted to determine an approximate weight of the detected debris, an approximate size of the detected debris and a type of the detected debris.

According to another aspect, when assessing the nature of the detected debris, the data processor is further adapted to classify the detected debris as one of an object that needs to be removed from the roadway and taken away and an object that can be moved off to a side of the roadway, and prioritize the detected debris based on an impact to the flow of traffic on the roadway.

According to another aspect, the data processor is further adapted to send, via the wireless communication network, a message to a manual service provider when an aerial response vehicle is not available that is specialized to remove/move the detected debris and is capable based on the type, size and weight of the detected debris.

According to another aspect, the plurality of aerial response vehicles includes at least one aerial response vehicle that is equipped with at least one sensor adapted to collect data related to the roadway, and the data processor is adapted to receive, via the wireless communication network, data collected by the aerial response vehicle that is equipped with at least one sensor adapted to collect data related to the roadway.

According to another aspect, the data processor is further adapted to assess if the detected debris requires traffic control measures, and when traffic control measures are required, assess the nature of the traffic control measures required, select an aerial response vehicle based on the required traffic control measures, and deploy the selected aerial response vehicle to provide the required traffic control measures.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a schematic view of a roadway and an accident scene including deployed aerial response vehicles according to an exemplary embodiment;

FIG. 4 is a side view of an aerial response vehicle equipped with a three-light traffic signal according to an exemplary embodiment;

FIG. 5 is a side view of an aerial response vehicle equipped with a traffic flag according to an exemplary embodiment;

FIG. 6 is a side view of an aerial response vehicle equipped with a camera according to an exemplary embodiment.

Figure 1:
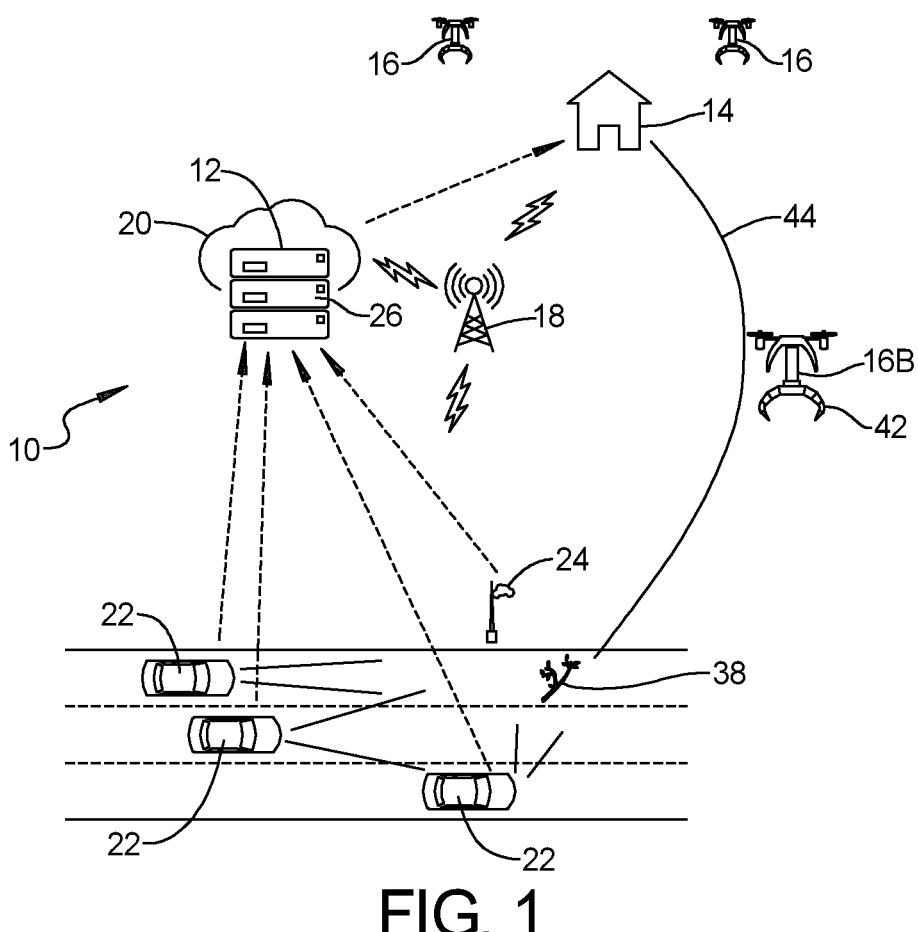
FIG. 1 is a schematic diagram of a road debris detection system according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a road debris detection system 10 includes a data processor 12 in wireless communication with a base facility 14. The base facility 14 includes a plurality of aerial response vehicles 16 adapted to be deployed from the base facility 16. Each of the plurality of aerial response vehicles 16 is specialized to perform specific tasks, as will be discussed in more detail below.

The data processor 12 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

In an exemplary embodiment, the data processor 12 is a cloud-based unit that communicates with other entities via a wireless communication network 18. The cloud 20 may include any suitable combination of hardware, firmware, software, etc. needed to communicate with the data processor 12, connected vehicles 22 and infrastructure sensors 24. The cloud 20 may include various combinations of servers, routers, switches, processing units (e.g., central processing units (CPUs)), circuits (e.g., application specific integrated circuits (ASICs)), data storage devices, etc. that are needed to carry out different tasks. Because of the widespread knowledge in the art of edge and cloud architectures, and because the present method 100 and system 10 are not intended to be confined to any particular architecture or arrangement and can be used with a wide range of such architectures, additional detailed descriptions of the edge and cloud systems have been omitted.

The data processor 12 includes a wireless communication module 26 that facilitates wireless communication between the data processor 12 and external sources, such as, but not limited to, the base facility 14, connected vehicles 22, service providers, mapping services, road and highway databases maintained by the department of transportation, a global positioning system, the internet, traffic information sources, vehicle-based support systems such as OnStar, etc. The data processor 12 is adapted to send and receive information via the wireless data communication network 18 over wireless communication channels such as a WLAN, 4G/LTE or 5G network, or the like. Such external sources can be communicated with directly via the internet, or may be cloud-based.

The data processor 12 is adapted to receive data related to a roadway via the wireless communication network 18 from various sources. In an exemplary embodiment, the data processor 12 is adapted to communicate wirelessly with a plurality of connected vehicles 22, and to receive data related to a roadway, via the wireless communication network 18, from the plurality of connected vehicles 22. Each of the plurality of connected vehicles 22 includes onboard sensors 28 adapted to collect data related to the roadway.

Figure 2:
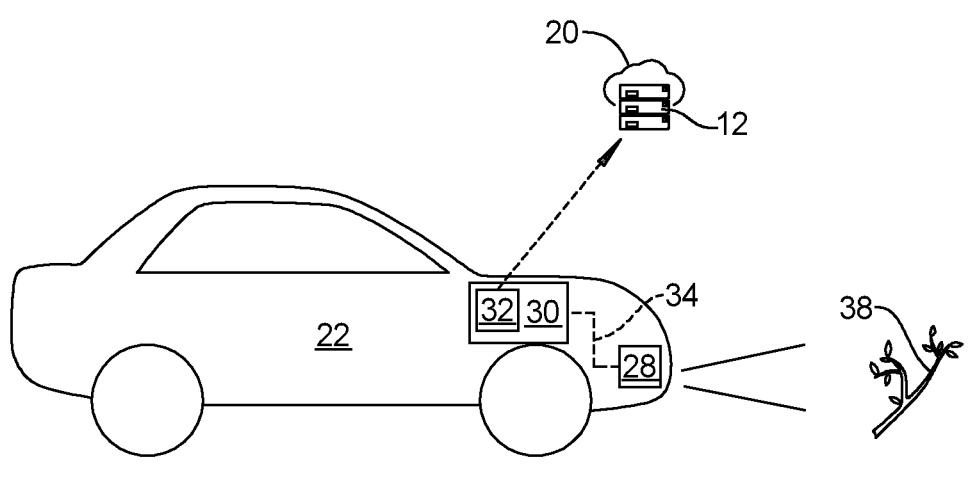
FIG. 2 is a schematic diagram of a connected vehicle according to an exemplary embodiment.

Referring to FIG. 2, connected vehicles 22 are equipped with the requisite hardware and software needed to gather, process, and exchange data with the system 10. According to a non-limiting example, each connected vehicle 22 includes vehicle electronics which include an vehicle control unit 30, a wireless communication module 32, a communications bus 34, a body control module (BCM), a global navigation satellite system (GNSS) receiver, and onboard vehicle sensors 28, as well as any other suitable combination of systems, modules, devices, components, hardware, software, etc. that are needed to carry out driving functionality.

The various components of the vehicle electronics may be connected by a vehicle communication network or communications bus 34 (e.g., a wired vehicle communications bus, a wireless vehicle communications network, or some other suitable communications network). Some or all of the different vehicle electronics may be connected for communication with each other via one or more communication busses, such as the communications bus 34. The communications bus 34 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications.

Those skilled in the art will appreciate that the schematic diagram of the connected vehicle 22 shown in FIG. 2 is simply meant to illustrate some of the more relevant hardware components used with the present system 10 and method 100 and it is not meant to be an exact or exhaustive representation of the vehicle hardware that would typically be found on such a connected vehicle 22. Furthermore, the structure or architecture of the vehicle electronics may vary substantially from that illustrated in FIG. 2. Thus, because of the countless number of potential arrangements and for the sake of brevity and clarity, the vehicle electronics are described in conjunction with the illustrated embodiment of FIG. 2, but it should be appreciated that the present system 10 and method 100 are not limited to such.

The wireless communications module 32 provides the vehicle with short range and/or long range wireless communication capabilities so that the connected vehicle 22 can communicate and exchange data with other devices or systems that are not a part of the vehicle electronics, such as the data processor 12. In the illustrated embodiment, the wireless communication module 32 includes a short-range wireless communications (SRWC) circuit, a cellular chipset, a processor, and memory. The SRWC circuit enables short-range wireless communications with any number of nearby devices (e.g., Bluetooth™, other IEEE 802.15 communications, Wi-Fi™, vehicle-to-vehicle (V2V) communications, vehicle-to-infrastructure (V2I) communications, other IEEE 802.11 communications, etc.). The cellular chipset enables cellular wireless communications, such as those used with a wireless carrier system. The wireless communication module 32 also includes antennas that can be used to transmit and receive these wireless communications. Although the SRWC circuit and the cellular chipset are illustrated as being a part of a single device, in other embodiments, the SRWC circuit and the cellular chipset can be a part of different modules, for example, the SRWC circuit can be a part of an infotainment unit and the cellular chipset can be a part of a telematics unit that is separate from the infotainment unit.

A global navigation satellite system (GNSS) receiver receives radio signals from a plurality of GNSS satellites. The GNSS receiver can be configured to comply with and/or operate according to particular regulations or laws of a given geopolitical region (e.g., country). The GNSS receiver can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. The GNSS receiver can include at least one processor and memory, including a non-transitory computer readable memory storing instructions (software) that are accessible by the processor for carrying out the processing performed by the receiver. The GNSS receiver may be used to provide navigation and other position-related services to the vehicle operator. The navigation services can be provided using a dedicated in-vehicle navigation module (which can be part of GNSS receiver and/or incorporated as a part of the wireless communication module 32 or other part of the vehicle electronics), or some or all navigation services can be done via the wireless communication module 32 (or other telematics-enabled device) installed in the connected vehicle 22, wherein the position information is sent to a remote location for purposes of providing the connected vehicle 22 with navigation maps, map annotations (points of interest, restaurants, etc.), route calculations, and the like. Such information is shared with the data processor 12 so the data processor 12 can identify precisely where each of the connected vehicles 22 are located in order to properly assess and fuse data collected from the connected vehicles 22.

Onboard sensors 28 are onboard vehicle sensors that can capture or sense information, which can then be sent to one or more other electronic vehicle devices and, via the wireless communication module 32, to the data processor 12. The onboard vehicle sensor data obtained by the sensors 28 can be associated with a time indicator (e.g., timestamp), as well as other metadata or information. The onboard vehicle sensor data can be obtained by the sensors 28 in a raw format, and may be processed by the sensors 28, such as for purposes of compression, filtering, and/or other formatting, for example. Moreover, the onboard vehicle sensor data (in its raw or formatted form), can be sent to one or more other electronic vehicle devices via communications bus 34, and/or to the wireless communications module 32. In at least one exemplary embodiment, the wireless communications module 32 can package the onboard vehicle sensor data for wireless transmission and send the onboard vehicle sensor data to the data processor 12.

The plurality of onboard sensors 28 present within each of the plurality of connected vehicles 22 can include non-visual sensors, such as Lidar, Radar, visual sensors, such as cameras, and motion sensors. Lidar is an electronic vehicle device that includes a lidar emitter and a lidar receiver. A lidar unit can emit non-visible light waves for purposes of object detection. The lidar unit operates to obtain spatial or other physical information regarding one or more objects within the field of view of the lidar unit through emitting light waves and receiving the reflected light waves. In many embodiments, the lidar unit emits a plurality of light pulses (e.g., laser light pulses) and receives the reflected light pulses using a lidar receiver. The lidar unit may be mounted (or installed) on the front of the connected vehicle 22. In such an embodiment, the lidar unit can face an area in front of the connected vehicle 22 such that the field of view of the lidar unit includes this area. The lidar unit can be positioned in the middle of the front bumper of the connected vehicle 22, to the side of the front bumper, on the sides of the connected vehicle 22, on the rear of the connected vehicle 22 (e.g., a rear bumper), etc. Lidar data captured by the lidar unit can be represented in a pixel array (or other similar visual representation). The lidar unit can capture static lidar images and/or lidar image or video streams.

Radar is an electronic vehicle device that uses radio waves to obtain spatial or other physical information regarding one or more objects within the field of view of the radar. A radar unit includes a transmitter that transmits electro-magnetic radio waves via use of a transmitting antenna and can include various electronic circuitry that enables the generation and modulation of an electromagnetic carrier signal. In other embodiments, the radar can transmit electromagnetic waves within another frequency domain, such as the microwave domain. The radar unit includes a signal processor, which can at least partially (e.g., fully) be implemented using a processor, or which may at least partially (e.g., fully) be implemented with dedicated circuitry. The radar can include a separate receiving antenna, or the radar can include a single antenna for both reception and transmission of radio signals. And, in other embodiments, the radar can include a plurality of transmitting antennas, a plurality of receiving antennas, or a combination thereof so as to implement multiple input multiple output (MIMO), single input multiple output (SIMO), or multiple input single output (MISO) techniques. A connected vehicle 22 can include one or more radar units that can be mounted at the same or different locations of the connected vehicle 22.

Vehicle camera(s) are mounted on connected vehicles 22 and may include any suitable system known or used in the industry. According to a non-limiting example, a connected vehicle 22 includes a collection of CMOS cameras or image sensors located around the connected vehicle 22, including a number of forward-facing CMOS cameras that provide digital images that can be subsequently stitched together to yield a 2D or 3D representation of the road and environment in front and/or to the side of the connected vehicle 22. The camera may provide vehicle video data to one or more components of the vehicle electronics, including to the wireless communication module 32 for communication to the data processor 12. Depending on the particular application, vehicle cameras may be a still camera, a video camera, and/or some other type of image generating device; a BW and/or a color camera; a front-, rear-side- and/or 360°-facing camera; part of a mono and/or stereo system; an analog and/or digital camera; a short-, mid- and/or long-range camera; and a wide and/or narrow FOV (aperture angle) camera, to cite a few possibilities. In one example, the vehicle camera outputs raw vehicle video data (i.e., with no or little pre-processing), whereas in other examples the vehicle camera includes image processing resources and performs pre-processing on the captured images before outputting them as vehicle video data.

Movement sensors can be used to obtain movement or inertial information concerning the connected vehicle 22, such as vehicle speed, acceleration, yaw (and yaw rate), pitch, roll, and various other attributes of the connected vehicle 22 concerning its movement as measured locally through use of the onboard vehicle sensors 28. Information from such movement sensors can be used by the data processor 12, in conjunction with data from other sensors 28 to understand movement behavior of a connected vehicle 22 to better determine location and nature of debris that is detected within a roadway 36 in the vicinity of the connected vehicle 22.

Movement sensors can be mounted on the connected vehicle 22 in a variety of locations, such as within an interior vehicle cabin, on a front or back bumper of the connected vehicle 22, and/or on the hood of the connected vehicle 22. The movement sensors can be coupled to various other electronic vehicle devices directly or via the communications bus 34. Movement sensor data can be obtained and sent to the other electronic vehicle devices, and/or the wireless communications module 32.

In an exemplary embodiment, the movement sensors can include wheel speed sensors, which can be installed into the connected vehicle 22 as an onboard vehicle sensor. The wheel speed sensors are each coupled to a wheel of the connected vehicle 22 and that can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle 22. In some embodiments, wheel speed sensors can be referred to as vehicle speed sensors (VSS) and can be a part of an anti-lock braking (ABS) system of the vehicle 22 and/or an electronic stability control program. The electronic stability control program can be embodied in a computer program or application that can be stored on a non-transitory, computer-readable memory (such as that which is included in memory of the vehicle control unit (VCU) or memory of the wireless communications module 32). The electronic stability control program can be executed using a processor of the VCU (or processor of the wireless communications module 32) and can use various sensor readings or data from a variety of vehicle sensors including sensor data from the plurality of onboard sensors 28.

Additionally or alternatively, the movement sensors can include one or more inertial sensors, which can be installed into the vehicle 22 as an onboard vehicle sensor. The inertial sensor(s) can be used to obtain sensor information concerning the acceleration and the direction of the acceleration of the vehicle 22. The inertial sensors can be microelectrome-chanical systems (MEMS) sensor or accelerometer that obtains inertial information. The inertial sensors can be used to detect collisions based on a detection of a relatively high deceleration. When a collision is detected, information from the inertial sensors used to detect the collision, as well as other information obtained by the inertial sensors, can be sent to the wireless communication module 32 (or other central vehicle computer of the vehicle). Additionally, the inertial sensor can be used to detect a high level of acceleration or braking. In one embodiment, the vehicle 22 can include a plurality of inertial sensors located throughout the vehicle 22. In some embodiments, each of the inertial sensors can be a multi-axis accelerometer that can measure acceleration or inertial force along a plurality of axes. The plurality of axes may each be orthogonal or perpendicular to one another and, additionally, one of the axes may run in the direction from the front to the back of the vehicle 22. Other embodiments may employ single-axis accelerometers or a combination of single- and multi-axis accelerometers. Other types of sensors can be used, including other accelerometers, gyroscope sensors, and/or other inertial sensors that are known or that may become known in the art.

The movement sensors can include one or more yaw rate sensors, which can be installed into the vehicle 22 as an onboard vehicle sensor. The yaw rate sensor(s) can obtain vehicle angular velocity information with respect to a vertical axis of the vehicle 22. The yaw rate sensors can include gyroscopic mechanisms that can determine the yaw rate and/or the slip angle. Various types of yaw rate sensors can be used, including micromechanical yaw rate sensors and piezoelectric yaw rate sensors.

The movement sensors can also include a steering wheel angle sensor, which can be installed into the vehicle 22 as an onboard vehicle sensor. The steering wheel angle sensor is coupled to a steering wheel of vehicle 22 or a component of the steering wheel, including any of those that are a part of the steering column. The steering wheel angle sensor can detect the angle that a steering wheel is rotated, which can correspond to the angle of one or more vehicle wheels with respect to a longitudinal axis of vehicle 22 that runs from the back to the front. Sensor data and/or readings from the steering wheel angle sensor can be used in the electronic stability control program that can be executed on a processor of the VCU or processor of the wireless communications module 32.

In an exemplary embodiment, the data processor 12 is further adapted to receive data related to the roadway 36 from at least one infrastructure sensor 24 that is adapted to collect data related to the roadway 36. Infrastructure sensors 24 are part of an edge system that includes any suitable combination of hardware, firmware, software, etc. needed to communicate with the data processor 12 and to help carry out the method 100 described herein. For instance, the edge system may include various combinations of servers, routers, switches, processing units (e.g., central processing units (CPUs)), circuits (e.g., application specific integrated circuits (ASICs)), data storage devices, etc. that are needed to carry out various edge computing and other tasks required by the present system 10 and method 100. The edge system may also be referred to as the "mobile edge computing (MEC) layer" or "fog layer," and these terms may be used interchangeably throughout the present application. The edge system includes a plurality of edge nodes, which each includes one or more roadside units (RSUs) and one or more infrastructure sensors 24 or edge sensors. The edge node can be associated with or dedicated to processing information pertaining to a particular edge cell, which is a predetermined or predefined location nearby the edge node. Also, although the present disclosure discusses embodiments where an edge node is associated with an edge cell, it should be appreciated that the edge node(s) may correspond to edge cell(s) according to various types of relationships—for example, a one-to-one relationship, a many-to-one relationship, a one-to-many relationship, or a many-to-many relationship. The edge node (e.g., RSUs) can include a processor and memory, as well as a wireless communications device, which can include a wireless transmitter and a wireless receiver. The wireless communications device can include circuitry to enable SRWCs, such as IEEE 802.11, 802.15, etc. The edge node and RSU may be hardwired to a land network, or, the edge node and RSU can include a cellular chipset similar to the chipset of the wireless communication modules 32 within the plurality of connected vehicles 22.

The RSU can be provided along or near a roadway, and can be used to control traffic signal(s), obtain traffic data, or perform other edge or fog layer processing for a roadway system. The RSU (or other part of the edge node) can also be communicatively coupled to one or more infrastructure sensors 24, which can be sensing devices that are configured to obtain sensor information concerning one or more roadways 36. For example, as shown in FIG. 1, the infrastructure sensor 24 can be a lidar unit, a radar unit, and/or a camera, which can be similar to the plurality of onboard sensors 28 of the plurality of connected vehicles 22, that detects the presence of a branch 38 within the roadway 36. Each edge node would likely include a variety of infrastructure sensors 24 that obtain information concerning one or more roadways 36, such as one or more lidar units, one or more radar units, and/or one or more cameras, thus more than one infrastructure sensor 24 may detect the branch 38 within the roadway 36. The RSU can communicate with the data processor 12 via use of short-range wireless communications (SRWCs), so as to enable the data processor 12 and the infrastructure sensor 24 to exchange information therebetween.

In another exemplary embodiment, the data processor 12 is adapted to receive data from at least one aerial response vehicle 16 that is equipped with at least one sensor 40 adapted to collect data related to the roadway 36. The at least one sensor 40 of the at least one aerial response vehicle 16 may be a visual, non-visual or motion sensor, as discussed above with respect to the onboard sensors 28 of the plurality of connected vehicles 22. Referring to FIG. 6, an aerial response vehicle 16A is shown equipped with a camera. Such an aerial response vehicle 16A may be assigned, by the data processor 12, to actively monitor a defined area to provide data on debris within the roadway 36 within the defined area.

In an exemplary embodiment, each of the aerial response vehicles 16, 16A is a drone. A drone is an unmanned aircraft. Drones are more formally known as unmanned aerial vehicles (UAVs) or unmanned aircraft systems. Essentially, a drone is a flying robot that can be remotely controlled or fly autonomously using software-controlled flight plans in its embedded systems, that work in conjunction with onboard sensors and a global positioning system (GPS). UAVs were initially most often associated with the military, however, now they are also used in a range of civilian and commercial roles, including search and rescue, surveillance, traffic monitoring, weather monitoring, firefighting, personal use, drone-based photography, videography, agriculture and even delivery services.

Drones have two basic functions: flight mode and navigation. To fly, drones must have a power source, such as battery or fuel. They also have rotors, propellers and a frame. The frame of a drone is typically made of a lightweight, composite material to reduce weight and increase maneuverability. Drones require a controller, which lets the operator use remote controls to launch, navigate and land the aircraft. Controllers communicate with the drone using radio waves, such as Wi-Fi. The aerial response vehicles 16, 16A of the present disclosure are controlled remotely by the data processor.

Drones have a large number of components, including electronic speed controllers, which control a motor's speed and direction; flight controller; GPS module; battery; antenna; receiver; cameras; sensors, including ultrasonic sensors and collision avoidance sensors; accelerometer, which measures speed; and altimeter, which measures altitude. Drone features vary based on the use it is put to. Examples of features include: various types of cameras with high-performance, zoom and gimbal steady-cam and tilt capabilities; artificial intelligence (AI) that enables the drone to follow objects; augmented reality features that superimpose virtual objects on the drone's camera feed; media storage format; maximum flight time, which determines how long the drone can remain in the air; maximum speeds, including ascent and descent; hover accuracy; obstacle sensory range; altitude hold, which keeps the drone at a fixed altitude; live video feed; and flight logs. Navigational systems, such as GPS, are typically housed in the nose of a drone. The GPS on a drone communicates its precise location to the controller. An onboard altimeter can communicate altitude information. The altimeter also helps keep the drone at a specific altitude if the controller designates one. Drones can be equipped with sensors, including ultrasonic, laser or lidar distance sensors, time-of-flight sensors, chemical sensors, and stabilization and orientation sensors. Visual sensors offer still and video data. Red, green and blue sensors collect standard visual red, green and blue wavelengths, and multispectral sensors collect visible and non-visible wavelengths, such as infrared and ultraviolet. Accelerometers, gyroscopes, magnetometers, barometers and GPS are also common drone features. The at least one sensor of the at least one aerial response vehicle may be a visual, non-visual or motion sensor, as discussed above with respect to the onboard sensors of the plurality of connected vehicles. For landing, drones use visual positioning systems with downward-facing cameras and ultrasonic sensors. The ultrasonic sensors determine how close the drone is to the ground. The aerial response vehicles 16, 16A that are housed within the base facility 14 are deployed and controlled by the data processor 12.

The data processor 12 is adapted to fuse the data collected by the plurality of connected vehicles 22 with the data collected by the at least one infrastructure sensor 24 and the data collected by the at least one aerial response vehicle 16A that is equipped with at least one sensor 40 adapted to collect data related to the roadway 36. If the data received by the data processor 12 includes debris, or an object within the roadway 36, the data processor 12 will use data received from other connected vehicles 22, infrastructure sensors 24 and aerial response vehicle sensors 40 within the same area to get multiple data inputs on the object or debris within the roadway 36 at that location. Such crowd-sourced data provides accurate information to allow the data processor 12 to verify that there is indeed an object or debris within the roadway 36 at that location, and to assess and identify such debris. As shown in FIG. 1, the onboard sensors 28 of the plurality of connected vehicles 22 (three shown), and the infrastructure sensor 24, shown as a camera mounted onto a pole next to the roadway 36, gather data showing a branch 38 that has fallen within the roadway 36. Referring to FIG. 3, the onboard sensors 28 of the plurality of connected vehicles 22 (four shown), and the camera 40 on an aerial response vehicle 16A that is monitoring the roadway 36 gather data showing an accident that has occurred within the roadway 36.

The data processor 12 extracts features of the debris and combines extracted features from multiple sources of data to allow the data processor 12 to accurately determine the nature (type, size, weight) of the debris detected within the roadway 36 and if the detected debris requires traffic control measures.

When debris is detected in the roadway 36, the data processor 12 is adapted to determine an approximate weight of the detected debris, an approximate size of the detected debris and a type of the detected debris. For example, referring again to FIG. 1, the data processor 12 will determine how long the branch 38 is and what the average circumference of the branch 38 is to calculate how much the branch 38 might weigh. The data processor 12 focuses on processing, analyzing, and making sense of visual data (images or videos) in the same way that humans do. The concept of computer vision is based on teaching computers to process an image at a pixel level and understand it. Technically, machines attempt to retrieve visual information, handle it, and interpret results through special software algorithms. Human vision and computer vision systems process visual data in a similar way. Computer vision systems can be used for object classification, wherein the system parses visual content and classifies the object on a photo/video to a defined category. For example, the system can find a dog among all objects in an image. Such systems can also be used for object identification, wherein the system parses visual content and identifies a particular object on a photo/video. For example, the system can find a specific dog among several dogs in an image. Such systems can also be used for object tracking, wherein the system processes video finds the object (or objects) that match search criteria and track its movement.

Computer vision technology tends to mimic the way the human brain works. Computer vision algorithms are based on pattern recognition. Computers are trained on a massive amount of visual data. Computers process images, label objects on them, and find patterns in those objects. For example, if sent a million images of flowers, the computer will analyze them, identify patterns that are similar to all flowers and, at the end of this process, will create a model "flower." As a result, the computer will be able to accurately detect whether a particular image is a flower every time it analyses a picture.

Deep learning, a specific subset of machine learning, uses algorithms to glean insights from data. Machine learning, on the other hand, relies on artificial intelligence, which acts as a foundation for both technologies. Deep learning fits inside machine learning, a subset of artificial intelligence. Deep learning represents a more effective way to do computer vision by using a specific algorithm called a neural network. The neural networks are used to extract patterns from provided data samples. Input values (raw data) get passed through the network created by perceptrons and end up in the output layer, which is a prediction, or a highly educated guess about a certain object. At the end of the analysis, the machine can classify an object with X % confidence.

Once the data processor 12 has determined the nature of the detected debris, the data processor 12 classifies the detected debris as one of an object that needs to be removed from the roadway 36 and taken away, an object that can be moved off to a side of the roadway 36, and an object that cannot be removed. For example, if the data processor 12 determines that the detected debris is a tree branch 38, such as shown in FIG. 1, the detected object will be classified as an object that can be moved off to a side of the roadway 36. If the data processor 12 determines that the detected debris is a mattress that has fallen off a truck, the detected object will be classified as an object that needs to be removed from the roadway 36 and taken away. If the data processor 12 determines that the detected debris is an object that cannot be removed with an aerial response vehicle 16, then the data processor 12 will send a message, via the wireless network 18, to a service provider (tow truck, police, etc.) so human intervention can handle the issue.

The data processor 12 is further adapted to prioritize the detected debris based on an impact to the flow of traffic on the roadway 36. The data processor 12 will, upon analysis, make a determination on the likely effect any detected debris will have on the flow of traffic. For example, a detected object may only require a vehicle to swerve slightly within the lane to avoid hitting the object, or a detected object may completely block a lane, requiring traffic to either change lanes, swerve into the oncoming lane, or swerve onto the shoulder of the road to avoid hitting the object, or a detected object may effectively block traffic, preventing the flow of traffic in one or both directions of the roadway 36. The data processor 12 will prioritize, for example, detected debris that blocks traffic altogether over detected debris that only requires vehicles to swerve within the lane. Thus, the data processor 12 will address higher priority detected debris first, thereby utilizing system 10 resources in a manner that keeps traffic flowing.

The data processor 12 then selects an aerial response vehicle 16 from the plurality of aerial response vehicles at the base facility 14 that is specialized to remove/move the detected debris and is capable based on the type, size and weight of the detected debris, and deploy the selected aerial response vehicle 16 to clean-up the debris. The plurality of aerial response vehicles 16 includes drones of various sizes and equipped with various components and abilities. For instance, the plurality of aerial response vehicles 16 may include drones that have various lifting capabilities. A "small" or "light duty" aerial response vehicle 16 may have a lifting capacity of 5 lbs., a "medium" or "normal duty" aerial response vehicle 16 may have a lifting capacity of 20 lbs., and a "large" or "heavy duty" aerial response vehicle 16 may have a lifting capacity of 100 lbs. In addition, the plurality of aerial response vehicles 16 may be equipped with different components. For example, an aerial response vehicle 16B may be equipped with an articulating grabber 42 adapted to grasp and hold an object, as shown in FIG. 1, to allow the aerial response vehicle 16B to grab and carry detected debris away. Alternatively, an aerial response vehicle 16 may be equipped with a scoop to allow the aerial response vehicle to scoop up loose debris, such as gravel or sand, or a blade to allow the aerial response vehicle to push debris off the roadway 36.

Based on the classification and identification of the detected debris, the data processor 12 then selects an aerial response vehicle 16 from the plurality of aerial response vehicles 16 at the base facility 14 that has lifting capability suitable for the detected debris and is equipped with components necessary to move or remove the detected debris, and deploys the selected aerial response vehicle 16 to clean-up the debris, as shown by arrow 44 in FIG. 1. Depending on the nature of the detected debris, and resource availability, the data processor 12 may deploy more than one aerial response vehicle 16 to expedite clean-up or removal of the detected debris. If none of the plurality of aerial response vehicles 16 available, or a combination thereof, has the capability and/or the componentry necessary to clean up the detected debris, the data processor 16 is adapted to send, via the wireless communication network 18, a message to a manual service provider for human intervention.

The data processor 12 is further adapted to determine if traffic control measures are required. For example, referring to FIG. 3, an accident has taken place which blocks the roadway 36 and makes passage by vehicles from either direction un-safe. Thus, the data processor 12 determines that traffic control measures are needed to prevent other vehicles from trying to pass the accident scene. In other examples, the data processer 12 determines, based on the data received, that there has been an earthquake, bridge collapse or other disaster scenario, wherein traffic control measures are needed to control the flow of or re-route traffic.

The data processor 12 assesses the data received and analyses the nature of the traffic control measures required. In the example shown in FIG. 3, the data processor 12 determines that traffic control measures are required to tell oncoming traffic from either direction that they must stop and wait for the accident scene to be cleared. Thus, traffic control measures that stop the traffic from either direction on either side of the accident scene are necessary. The plurality of aerial response vehicles 16 includes drones equipped with various traffic control componentry. Referring to FIG. 4, an aerial response vehicle 16C is equipped with a three light traffic signal 46. Referring to FIG. 5, an aerial response vehicle 16D is equipped with a lighted or non-lighted caution flag 48. It should be understood by those skilled in the art that an aerial response vehicle 16 of the present disclosure may be equipped with any type of traffic control indicators that could be found on roadways, within construction zones, at an accident scene, etc. For example, an aerial response vehicle 16 may be deployed to hover over a lane of a highway signaling traffic to merge into an adjacent lane due to debris located in the lane ahead. An aerial response vehicle 16 may also include electronic signage adapted to display a custom message to vehicles traveling on a roadway 36 depending on upcoming circumstances on the roadway 36 ahead, such as warning of an upcoming construction zone or hazardous driving conditions due to localized weather conditions.

Referring again to FIG. 3, the data processor 12 deploys two aerial response vehicles 16C, each one with a three-light traffic signal 46, to display a red light and block traffic coming from either direction. At some point, when data received by the data processor 12 indicates that it is now safe for traffic to slowly move through the accident scene, the traffic lights 46 will display a yellow light, signaling to the stopped traffic that it is safe to slowly proceed. Finally, when the accident scene is completely cleared, the traffic lights 46 will display a green light, signaling to the traffic in each direction that it is safe to proceed normally. Eventually, when the traffic flow has returned to normal, the deployed aerial response vehicles 16C will return to the base facility 14.

Figure 7:
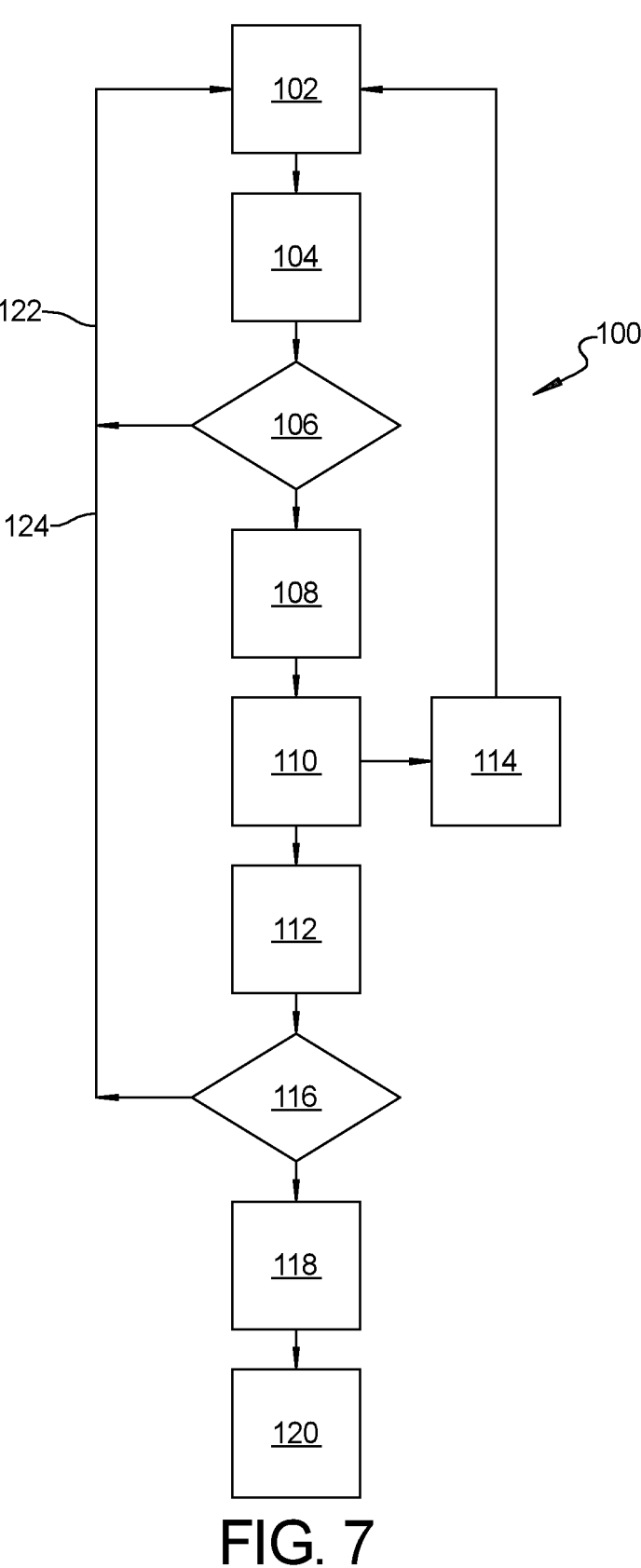
FIG. 7 is a flow chart illustrating a method according to an exemplary embodiment.

Referring to FIG. 7, a method 100 of road debris detection includes, starting at block 102, receiving, with a data processor 12 of a road debris detection system 10, data related to a roadway 36, and moving to block 106, assessing, with the road debris detection system 10, if debris is present within the roadway 36. If no debris is present within the roadway 36, the method 100 reverts back to block 102, as indicated by line 122.

If road debris is detected at block 106, then, moving to block 108, the method 100 includes assessing, with the road debris detection system 10, the nature of the detected debris, moving to block 110, selecting, with the road debris detection system 10, an aerial response vehicle 16 based on the nature of the detected debris, and, moving to block 112, sending, with the road debris detection system 10, the selected aerial response vehicle 16 to clean-up the debris.

In an exemplary embodiment, the receiving, with the road debris detection system 10, data related to the roadway 36 at block 102 further includes, receiving, via a wireless communication network 18, data collected by a plurality of connected vehicles 22 that each include a plurality of onboard sensors 28 adapted to collect data related to the roadway 36.

In another exemplary embodiment, the receiving, with the road debris detection system 10, data related to the roadway 36 at block 102 further includes, receiving, via a wireless communication network 18, data collected by at least one infrastructure sensor 24 that is adapted to collect data related to the roadway 36.

In still another exemplary embodiment, the method 100 further includes, at block 104, fusing, with the road debris detection system 10, the data collected by the plurality of connected vehicles 22 with the data collected by the at least one infrastructure sensor 24.

In another exemplary embodiment, the assessing, with the road debris detection system 10, the nature of the detected debris at block 108 further includes determining, with the road debris detection system 10, an approximate weight of the detected debris, an approximate size of the detected debris and a type of the detected debris.

In another exemplary embodiment, the assessing, with the road debris detection system 10, the nature of the detected debris at block 108 further includes classifying the detected debris as one of an object that needs to be removed from the roadway 36 and taken away and an object that can be moved off to a side of the roadway 36, and prioritizing the detected debris based on an impact to the flow of traffic on the roadway 36.

In another exemplary embodiment, the selecting, with the road debris detection system 10, an aerial response vehicle 16 based on the nature of the detected debris at block 110 further includes selecting, from the plurality of aerial response vehicles 16 housed within the base facility 14, an aerial response vehicle 16 that is specialized to remove/move the detected debris and is capable based on the type, size and weight of the detected debris.

In another exemplary embodiment, the method 100 includes, moving to block 114, sending, via the wireless communication network 18, a message to a manual service provider, when an aerial response vehicle 16 is not available that is specialized to remove/move the detected debris and is capable based on the type, size and weight of the detected debris.

In another exemplary embodiment, the receiving, with the road debris detection system 10, data related to the roadway 36 at block 102 further includes, receiving, via a wireless communication network 18, data collected by an aerial response vehicle 16A that is equipped with at least one sensor 40 adapted to collect data related to the roadway 36.

In another exemplary embodiment, the method 100 further includes, moving to block 116, assessing, with the road debris detection system 10, if the debris requires traffic control measures. If the data processor 12 determines that traffic control measures are not required, then the method 100 reverts to block 102, as indicated by line 124. When the data processor 12 determines that traffic control measures are required at block 116, the method 100 includes, moving to block 118, assessing, with the road debris detection system 10, the nature of the traffic control measures required, and selecting, with the road debris detection system 10, an aerial response vehicle 16 based on the required traffic control measures. Once an appropriate aerial response vehicle 16 is selected, moving the block 120, the method 100 includes sending, with the road debris detection system 10, the selected aerial response vehicle 16 to provide the required traffic control measures.

A system 10 and method 100 of the present disclosure offers the advantage of automatically and autonomously detecting debris within a roadway 36, assessing the debris and deploying an appropriate aerial response vehicle 16.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of road debris detection, comprising:
receiving, with a data processor of a road debris detection system, crowd sourced data related to a roadway from:
a plurality of connected vehicles that each include a plurality of onboard sensors adapted to collect data related to the roadway; and
at least one infrastructure sensor that is adapted to collect data related to the roadway;
assessing, with the data processor of the road debris detection system, if debris is present within the roadway; and
when debris is present within the roadway, automatically:
assessing, with the data processor of the road debris detection system, a nature of the debris present within the roadway;
selecting, with the road debris detection system, an aerial response vehicle based on the nature of the debris present within the roadway; and
deploying and controlling, with the road debris detection system, the selected aerial response vehicle to clean-up the debris present within the roadway; and
assessing if the debris requires traffic control measures to control the flow of traffic and re-route traffic; and
when traffic control measures are required to control the flow of traffic and reroute traffic:
assessing a nature of the traffic control measures required;
selecting an aerial response vehicle equipped with traffic control indicators based on the required traffic control measures; and
deploying and controlling the selected aerial response vehicle to provide the required traffic control measures.

2. The method of claim 1, wherein the method further includes fusing, with the road debris detection system, the data collected by the plurality of connected vehicles with the data collected by the at least one infrastructure sensor.

3. The method of claim 1, wherein the assessing, with the road debris detection system, the nature of the debris present within the roadway further includes determining, with the road debris detection system, an approximate weight of the debris present within the roadway, an approximate size of the debris present within the roadway and a type of the debris present within the roadway.

4. The method of claim 3, wherein the assessing, with the road debris detection system, the nature of the debris present within the roadway further includes:

classifying the debris present within the roadway as one of an object that needs to be removed from the roadway and taken away and an object that can be moved off to a side of the roadway; and prioritizing the debris present within the roadway based on an impact to the flow of traffic on the roadway.

5. The method of claim 4, wherein the road debris detection system includes a base facility wherein a plurality of aerial response vehicles are housed and from which the plurality of aerial response vehicles are adapted to be deployed, each of the plurality of aerial response vehicles being specialized to perform specific tasks, wherein, the selecting, with the road debris detection system, an aerial response vehicle based on the nature of the debris further includes selecting, from the plurality of aerial response vehicles housed within the base facility, an aerial response vehicle that is specialized to remove/move the debris present within the roadway and is capable based on the type, size and weight of the debris present within the roadway.

6. The method of claim 5, further including sending, via the wireless communication network, a message to a manual service provider, when an aerial response vehicle is not available that is specialized to remove/move the debris present within the roadway and is capable based on the type, size and weight of the debris present within the roadway.

7. The method of claim 5, wherein the receiving, with the road debris detection system, data related to the roadway further includes, receiving, via a wireless communication network, data collected by an aerial response vehicle that is equipped with at least one sensor adapted to collect data related to the roadway.

8. A road debris detection system, comprising:

a data processor in wireless communication, via a wireless communication network, with a base facility, the base facility including a plurality of aerial response vehicles adapted to be deployed from the base facility, each of the plurality of aerial response vehicles being specialized to perform specific tasks;

the data processor adapted to:

receive, via the wireless communication network, crowd-sourced data related to a roadway from:

a plurality of connected vehicles that each include a plurality of onboard sensors adapted to collect data related to the roadway; and at least one infrastructure sensor that is adapted to collect data related to the roadway:

assess if debris is present within the roadway; and when debris is present within the roadway:

assess a nature of the debris present within the roadway;

select an aerial response vehicle from the plurality of aerial response vehicles at the base facility that is specialized to remove/move the detected debris present within the roadway and is capable based on the type, size and weight of the detected debris present within the roadway; and deploy and control the selected aerial response vehicle to clean-up the debris present within the roadway; and assess if the detected debris present within the roadway requires traffic control measures to control the flow of traffic and re-route traffic; and when traffic control measures are required to control the flow of traffic and re-route traffic:

assess a nature of the traffic control measures required;

select an aerial response vehicle equipped with traffic control indicators based on the required traffic control measures; and deploy and control the selected aerial response vehicle to provide the required traffic control measures.

9. The system of claim 8, wherein the data processor is adapted to fuse the data collected by the plurality of connected vehicles with the data collected by the at least one infrastructure sensor.

10. The system of claim 8, wherein the data processor is further adapted to determine an approximate weight of the debris present within the roadway, an approximate size of the debris present within the roadway and a type of the debris present within the roadway.

11. The system of claim 10, wherein, when assessing the nature of the debris present within the roadway, the data processor is further adapted to:

classify the debris present within the roadway as one of an object that needs to be removed from the roadway and taken away and an object that can be moved off to a side of the roadway; and prioritize the debris present within the roadway based on an impact to the flow of traffic on the roadway.

12. The system of claim 8, wherein the data processor is further adapted to send, via the wireless communication network, a message to a manual service provider when an aerial response vehicle is not available that is specialized to remove/move the debris present within the roadway and is capable based on the type, size and weight of the debris present within the roadway.

13. The system of claim 8, wherein the plurality of aerial response vehicles includes at least one aerial response vehicle that is equipped with at least one sensor adapted to collect data related to the roadway, and the data processor is adapted to receive, via the wireless communication network, data collected by the aerial response vehicle that is equipped with at least one sensor adapted to collect data related to the roadway.

14. A road debris detection system, comprising:

a data processor in wireless communication with a base facility;

the base facility including a plurality of aerial response vehicles adapted to be deployed from the base facility, each of the plurality of aerial response vehicles being specialized to perform specific tasks;

the data processor adapted to:

receive data related to a roadway, via a wireless communication network, from a plurality of connected vehicles that each include a plurality of onboard sensors adapted to collect data related to the roadway, and from at least one infrastructure sensor that is adapted to collect data related to the roadway, and from at least one aerial response vehicle that is equipped with at least one sensor adapted to collect data related to the roadway, the data processor adapted to fuse the data collected by the plurality of connected vehicles with the data collected by the at least one infrastructure sensor and the data collected by the at least one aerial response vehicle that is equipped with at least one sensor adapted to collect data related to the roadway;

assess if debris is present within the roadway and if the debris present within the roadway requires traffic control measures to control the flow of traffic and re-route traffic; and when debris is present within the roadway:

determine an approximate weight of the debris present within the roadway, an approximate size of the debris present within the roadway and a type of the debris present within the roadway;

classify the debris present within the roadway as one of an object that needs to be removed from the roadway and taken away, an object that can be moved off to a side of the roadway, and an object that cannot be removed; and prioritize the debris present within the roadway based on an impact to the flow of traffic on the roadway;

select an aerial response vehicle from the plurality of aerial response vehicles at the base facility that is specialized to remove/move the debris present within the roadway and is capable based on the type, size and weight of the debris present within the roadway, and deploy and control the selected aerial response vehicle to clean-up the debris; and send, via the wireless communication network, a message to a manual service provider when an aerial response vehicle is not available that is specialized to remove/move the debris present within the roadway and is capable based on the type, size and weight of the detected debris present within the roadway; and when traffic control measures are required to control the flow of traffic and re-route traffic:

assess a nature of the traffic control measures required;

select an aerial response vehicle equipped with one of:

a three light traffic signal;

a lighted caution flag; or electronic signage; and deploy and control the selected aerial response vehicle to provide the required traffic control measures.

15. The method of claim 1, wherein the selecting an aerial response vehicle equipped with traffic control indicators based on the required traffic control measures further includes selecting an aerial response vehicle equipped with a three light traffic signal.

16. The method of claim 1, wherein the selecting an aerial response vehicle equipped with traffic control indicators based on the required traffic control measures further includes selecting an aerial response vehicle equipped with a lighted caution flag.

17. The method of claim 1, wherein the selecting an aerial response vehicle equipped with traffic control indicators based on the required traffic control measures further includes selecting an aerial response vehicle equipped with electronic signage.

18. The system of claim 8, wherein, when traffic control measures are required to control the flow of traffic and re-route traffic, the data processor is further adapted to select an aerial response vehicle equipped with a three light traffic signal.

19. The system of claim 8, wherein, when traffic control measures are required to control the flow of traffic and re-route traffic, the data processor is further adapted to select an aerial response vehicle equipped with a lighted caution flag.

20. The system of claim 8, wherein, when traffic control measures are required to control the flow of traffic and re-route traffic, the data processor is further adapted to select an aerial response vehicle equipped with electronic signage.

* * * * *